US011254296B2

(12) United States Patent
Peinert et al.

(10) Patent No.: US 11,254,296 B2
(45) Date of Patent: Feb. 22, 2022

(54) METHOD AND A SYSTEM FOR ESTIMATING THE WATER CONTENT OF BRAKE FLUID IN A BRAKE SYSTEM

(71) Applicant: Volvo Car Corporation, Gothenburg (SE)

(72) Inventors: Niklas Peinert, Gothenburg (SE); Madeleine Stoopendahl, Klövedal (SE)

(73) Assignee: Volvo Car Corporation, Gothenburg (SE)

( * ) Notice: Subject to any disclaimer, the term of this patent is extended or adjusted under 35 U.S.C. 154(b) by 202 days.

(21) Appl. No.: 16/424,681

(22) Filed: May 29, 2019

(65) Prior Publication Data
US 2020/0001851 A1   Jan. 2, 2020

(30) Foreign Application Priority Data

Jun. 29, 2018   (EP) .................................... 18180730

(51) Int. Cl.
*B60T 17/22*     (2006.01)
*B60T 11/228*    (2006.01)
(Continued)

(52) U.S. Cl.
CPC ........... *B60T 17/221* (2013.01); *B60T 11/228* (2013.01); *B60T 13/12* (2013.01); *F15B 21/041* (2013.01)

(58) Field of Classification Search
CPC ........ B60T 17/221; B60T 17/22; B60T 1/065; F16D 66/00; F16D 2066/001; F16D 66/027; F16D 66/028; F16D 55/22; F16D 66/006
See application file for complete search history.

(56) References Cited

U.S. PATENT DOCUMENTS

| 6,119,059 A  * | 9/2000 | Tai ........................ B60T 17/221 303/122.03 |
| 6,691,562 B2 * | 2/2004 | Petty ...................... G01N 21/78 73/61.46 |

(Continued)

FOREIGN PATENT DOCUMENTS

| DE | 3221403 A1 * | 12/1983 | ......... G01N 33/2847 |
| DE | 0 205 870 B1 |  5/1986 | |

(Continued)

OTHER PUBLICATIONS

English translation of EP0205870a1 (Year: 1986).*
(Continued)

*Primary Examiner* — Robert A. Siconolfi
*Assistant Examiner* — Mahbubur Rashid
(74) *Attorney, Agent, or Firm* — Clements Bernard Walker; Christopher L. Bernard (57) ABSTRACT

A method for estimating water content of brake fluid in a brake system including brake calipers and a brake fluid container, the brake calipers and the container each including a sensor configured to detect a water content of the brake fluid, the method including: arranging the brake system in a controlled environment; for a predetermined time period, exposing the brake system to a controlled temperature and humidity such that an increase in water content in the brake fluid is accelerated; determining the water content of the brake fluid in the brake fluid container and in each brake caliper as a function of time; and based on the determined water content as a function of time, establishing a model describing the relation between the water content of brake fluid in a brake caliper and the water content in the brake fluid in the brake fluid container.

15 Claims, 4 Drawing Sheets

(51) Int. Cl.
  *B60T 13/12* (2006.01)
  *F15B 21/041* (2019.01)

(56) References Cited

U.S. PATENT DOCUMENTS

| | | | | |
|---|---|---|---|---|
| 7,374,253 | B2 * | 5/2008 | Buschmann | B60T 8/4081 |
| | | | | 303/122.08 |
| 8,140,213 | B2 * | 3/2012 | Boss | G07C 5/008 |
| | | | | 701/29.4 |
| 2006/0138861 | A1 | 6/2006 | Buschmann et al. | |
| 2006/0152072 | A1 * | 7/2006 | Baechle | B60T 8/34 |
| | | | | 303/11 |
| 2006/0283244 | A1 | 12/2006 | Schonlau et al. | |

FOREIGN PATENT DOCUMENTS

| | | | | |
|---|---|---|---|---|
| DE | 3816315 | A1 * | 12/1989 | B60T 17/22 |
| EP | 0205870 | A1 | 12/1986 | |
| EP | 0205870 | B1 | 4/1989 | |
| EP | 0646785 | A1 * | 4/1995 | G01N 22/04 |
| FR | 2960203 | B1 | 11/2011 | |
| GB | 2 230 098 | A | 10/1990 | |
| JP | 11278251 | A * | 10/1999 | |
| JP | H11278251 | A | 10/1999 | |
| WO | WO-9846984 | A2 * | 10/1998 | G01N 33/2847 |
| WO | WO-0079256 | A1 * | 12/2000 | G01N 25/56 |

OTHER PUBLICATIONS

Thomas E. Ryan;Determining Brake Fluid Quality By RefractometerA European Study of New and "In-Service" Fluids; Leica Microsystems Inc.; pp. 1-9.
Jan. 30, 2019 European Search Report issue on International Application No. EP 18180730.
May 31, 2021, Chinese Office Action Issued for CN application No. 201910542061.3.

\* cited by examiner

METHOD AND A SYSTEM FOR ESTIMATING THE WATER CONTENT OF BRAKE FLUID IN A BRAKE SYSTEM

CROSS-REFERENCE TO RELATED APPLICATION

The present disclosure claims the benefit of priority of co-pending European Patent Application No. 18180730.6, filed on Jun. 29, 2018, and entitled "A METHOD AND A SYSTEM FOR ESTIMATING THE WATER CONTENT OF BRAKE FLUID IN A BRAKE SYSTEM," the contents of which are incorporated in full by reference herein.

TECHNICAL FIELD

The present invention relates to a method and a system for estimating the water content of brake fluid in a brake system for a vehicle. In particular, the present invention relates to estimation of the water content of brake fluid in a brake caliper.

BACKGROUND

It is important to ensure that the brake fluid in the brake system of a vehicle does not contain too much water. An elevated water content increases the freezing temperature and reduces the boiling point which may lead to that the brake fluid freezes in cold conditions and that it starts to boil during normal operating conditions. Both freezing and boiling of the brake fluid may lead to a reduced braking effect and/or to damage of the brake system. Accordingly, it must be ensured that the water content of the brake fluid remains below a predetermined threshold level.

The brake fluid is naturally hydroscopic, meaning that it easily attracts water from the surrounding environment. The water content of brake fluid is in part influenced by the ambient temperature in combination with the air humidity. However, since the average temperature and humidity where the vehicle is operated will be different in different locations, it is difficult to estimate the long term buildup of water in the brake fluid. A vehicle operated in coastal regions may for example build up water in the brake fluid many times faster than a vehicle at an inland location with dry air.

In order to be able to estimate when a service of the brake fluid is needed, the water content of the brake fluid must somehow be measured since theoretical calculations are not feasible due to number of variable involved influencing the properties of the brake fluid. However, determine the water content of brake fluid in each brake caliper would be both complex and expensive using known methods and thereby difficult to industrialize in a production vehicle.

Accordingly, there is a need for improved means for determining the water content in brake fluid of a brake system for a vehicle.

SUMMARY

In view of above-mentioned and other drawbacks of the prior art, it is an object of the present invention to provide an improved method and system for estimating the water content of brake fluid in a brake system.

According to one embodiment of the invention, there is provided a method for estimating water content of brake fluid in a brake system including a plurality of brake calipers and a brake fluid container, each of the plurality of brake calipers and the brake fluid container including a sensor configured to detect a parameter indicative of the water content of the brake fluid. The method includes: arranging the brake system in a controlled environment; for a predetermined time period, exposing the brake system to a controlled air temperature and air humidity for a predetermined period of time such that an increase in water content in the brake fluid is accelerated in comparison to the increase in water content during normal operating conditions of a vehicle; determining the water content of the brake fluid in the brake fluid container and in each brake caliper as a function of time during the predetermined time period; and based on the determined water content as a function of time, establishing a model describing the relation between water content of brake fluid in a brake caliper and water content in the brake fluid of the brake fluid container.

The brake system may here be regarded as a test system where each of the brake calipers is equipped with a sensor, and where the sensor may be arranged in a manner which is not possible in a vehicle in use.

In the present context, the controlled environment refers to an enclosed container, space or room in which the brake system is arranged and where both air temperature and air humidity can be controlled with high accuracy. To achieve an accelerated increase in water content in the brake fluid compared to during normal operating conditions for a vehicle, the air temperature and/or the air humidity is controlled to be higher than an expected air temperature and air humidity during normal operation of a vehicle. Thereby, by increasing the rate of water buildup in the brake fluid, i.e. the rate at which the water content increases in the brake fluid, the total time required for establishing the model is reduced. The geographical locations having the highest air humidity and at the same time a high temperature are found in equatorial regions close to the sea, such as in south and southeast Asia. Accordingly, it is desirable that the controlled environment at least emulates the conditions found in those regions, and preferably also exceeding the temperature and humidity levels to reduce the time for reaching the critical water content in order to establish the model.

The present invention is based on the realization that an accurate model describing the water content in a brake caliper as a function of the water content of brake fluid in a brake fluid container, can be achieved by monitoring the buildup of water in the brake system in a controlled environment. Thereby, there is no need for sensors in each brake caliper in a production vehicle. Moreover, the model may be applied for all environments in which the vehicle operates. By using the described model, the reliability and safety of a brake system in a vehicle can be improved, and it may also be possible to increase the length of the service interval required for replacing the brake fluid.

According to one embodiment of the invention, the method may advantageously further include repeatedly increasing and decreasing the air temperature and the air humidity according to a predetermined cycle during the predetermined time period. The increase of water content in brake fluid mainly comes from two sources. First, water may enter into the brake system by means of permeation through osmosis in the brake hoses. Second, water may also enter the brake system at the brake fluid reservoir via the reservoir lid. The rate of permeation through the rubber material depends both on temperature and on the air humidity, and an elevated air temperature and air humidity will thus increase the rate of water buildup in the brake fluid near the brake calipers. It should be noted that there is no natural circulation of brake fluid in the brake system, and that water entering the brake fluid at or near the brake calipers can be assumed to remain there and to only very slowly become evenly distributed in the brake fluid. Water entering the brake system at the brake system reservoir mainly occurs due to "breathing" of the system where, when the temperature of the brake fluid increases and decreases, it expands and contracts to force air in and out of the brake fluid container. Moist in the air entering the brake fluid container will then be absorbed by the brake fluid. Accordingly, by means of the described cycling where the temperature is increased and decreased repeatedly, the water content in the brake fluid in the brake fluid container will increase. Due to the different mechanisms of water entering the brake system, the water content may be different in the brake calipers compared to in the brake fluid container, thereby making it important to determine the relationship between water content in the brake calipers and the brake fluid container.

According to one embodiment of the invention, establishing a model includes establishing a model describing the water content for each of the plurality of brake calipers as a function of the water content in the brake fluid of a brake fluid container. Thereby, the water content in each individual brake caliper can be determined. The rate of water buildup in a brake caliper may vary based on a number of parameters, such as the length of the brake tube or brake hose connecting the brake caliper to the brake fluid container. Thus, depending on the type of connections used, for a brake system where the brake fluid container is located near the front of the vehicle, a rear brake caliper can be assumed to have a higher rate of water buildup and thereby reach a higher water content due to the longer connection to the brake fluid container compared to a front brake caliper. However, it can be assumed that the components of the brake system are made with sufficiently high accuracy so that manufacturing tolerances does not influence the rate of water buildup.

According to one embodiment of the invention, a maximum air temperature is preferably a temperature in the range of 60 to 100° C. It has been found that a maximum temperature in the described temperature range increases the rate of water build up sufficiently to reduce the total time for establishing the model, while the temperature is not so high so that it significantly alters or damages the components of the brake system.

According to one embodiment of the invention, a maximum air humidity may be a humidity in the range of 80 to 100% and the predetermined time period may be in the range of 50 to 100 days. It has been found that, for an example brake system, the above described conditions are sufficient to reach a water content of approximately 2-4% within the predetermined time period, which is a commonly used upper limit for water in brake fluid. At a water content of approximately 2-4%, the wet boiling point of the brake fluid may coincide with operating temperatures occurring in a brake system. The wet boiling point of brake fluid is defined as the boiling point for brake fluid at a given water content. However, a safety margin is preferably employed so that a critical boiling temperature for the brake system is reached only for a water content which is significantly higher than the discussed 2-4% range, while a water content in the described range is used to indicate that the brake fluid needs to be replaced. Moreover, the boiling point for a particular brake fluid at a given water content is different depending on the type of brake fluid used. Accordingly, an established model can be assumed to be valid for a specific type of brake fluid, or for a family of brake fluids having similar properties.

The critical temperature of the brake system may be regarded as the maximum temperature that the brake fluid is expected to reach during operation of the vehicle. The brake fluid typically reaches its highest temperature during heavy and/or prolonged braking such as during a long descent, unless a malfunctioning brake causes the brake fluid to reach excessive temperatures.

It should also be noted that the above described temperature, humidity and time ranges describe a preferable example applicable for a specific brake system to reach a critical water content in the selected brake fluid, i.e. reaching a critical water content in at least one of the brake calipers. The skilled person readily realizes that a model describing the water content of brake fluid as a function of time, may be established also by using values outside of the described ranges.

According to one embodiment of the invention, establishing a model includes establishing a model describing the water content of brake fluid in each of the plurality of brake calipers as a function of the water content of the brake fluid in the brake fluid container. Thereby, by monitoring the water buildup in each of the brake calipers in the brake system, it can be seen if there is a difference in the rate of water buildup between the different brake calipers.

According to one embodiment of the invention, determining the water content of the brake fluid includes measuring a conductivity, a density, a viscosity and/or a refraction of the brake fluid. All of the aforementioned physical parameters are indicative of a water content of the brake fluid, and it can be assumed that the relation between the respective parameter and the water content of brake fluid is known. In a test environment, the sensor type most suitable for a particular brake system and brake fluid may be selected. The choice of property to measure may also be based on sensor availability and sensor configuration.

According to one embodiment of the invention, the method may further include, in a brake system in a vehicle including a plurality of brake calipers and a brake fluid container, the brake fluid container including a sensor configured to detect a parameter indicative of a water content of the brake fluid, determining a water content in the brake fluid container and estimating a water content in a brake caliper based on the established model. Thereby, the water content of the brake fluid in a brake caliper of the vehicle can be determined by measuring the water content of brake fluid in the brake fluid container, followed by determining the brake fluid water content of a brake caliper using the established model. Thereby, it can be determined if the water content is at or near critical levels and if the brake fluid needs replacing. The water content may increase naturally as described earlier, but an increased water content of the brake fluid may also be indicative of a fault in the brake system.

When employing the described method in a brake system of a vehicle, it may be preferable, but not required, that the same sensor type is used to determine the water content of brake fluid in the brake fluid container as was used to establish the model. However, due to practical limitations, it may not be possible to use the same type of sensor in a vehicle as in a test environment, and sufficient accuracy may be still be achievable using a different sensor type. The change in density and viscosity of the brake fluid as a function of water content is typically relatively small and may therefore be difficult to measure in a vehicle, whereas the change in conductivity and refraction is more easily detectable.

According to one embodiment of the invention, the method may further include estimating a water content of the brake caliper assumed to have the highest water content for a given water content of the brake fluid in the brake fluid container according to the predetermined model. Thereby, the brake caliper having the water content which is assumed to be closest to a critical water content is evaluated to determine if the brake fluid needs replacing.

According to one embodiment of the invention, the method may further include estimating a water content of the brake caliper having the longest fluid connection between the brake caliper and the brake fluid container. If it is not known which of the brake calipers it is that has the highest water content, e.g. if the differences in water content between different brake caliper in the established model are insignificant, it may be preferable to use the brake caliper having the longest fluid connection between the brake fluid container and the brake caliper since the increase in water content in a brake caliper is related to the length of the fluid connection.

According to one embodiment of the invention, the method may further include estimating a water content of the brake caliper at the rear wheel on a side opposite of the driver side. Many roads are built with a slope from a center of the road towards the edges so that water runs off the road, thereby avoiding that water is gathering on the road. This means that the wheels closest to the road edge, i.e. on the side opposite of the driver side, on average will be exposed to more water than the inner wheels, and water splashing onto parts of the brake system may influence the buildup of water in the brake fluid. Moreover, it can be assumed that in most cases, the brake fluid container is accessible via the hood at the front of the car, meaning that the distance from the brake fluid container to the rear brake caliper is longer than the distance to the front brake caliper. Accordingly, if there is no specific reason to estimate the water content in any given brake caliper, the brake caliper at the rear wheel on a side opposite of the driver side can be assumed to have the highest water content.

According to a second aspect of the invention, there is provided a brake system for a vehicle including: a plurality of brake calipers; a brake fluid container including a sensor configured to detect a parameter indicative of a water content of the brake fluid in the brake fluid container; and a control unit configured to determine a water content of the brake fluid in the brake fluid container based on the detected parameter and to estimate a water content of the brake fluid in a brake caliper based on the determined water content of brake fluid in the brake fluid container using a predetermined model describing the relation between the water content of brake fluid in a brake caliper and the water content in the brake fluid of the brake fluid container.

Additional effects and features of the second aspect of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

In the present detailed description, various embodiments of the system and method according to the present invention are mainly described with reference to an example brake system for a vehicle. Moreover, in the present disclosure, the brake system is described as a brake system including four brake calipers, as customary in a car. However, the described method is equally applicable for brake systems including fewer or more brake calipers.

Figure 1:
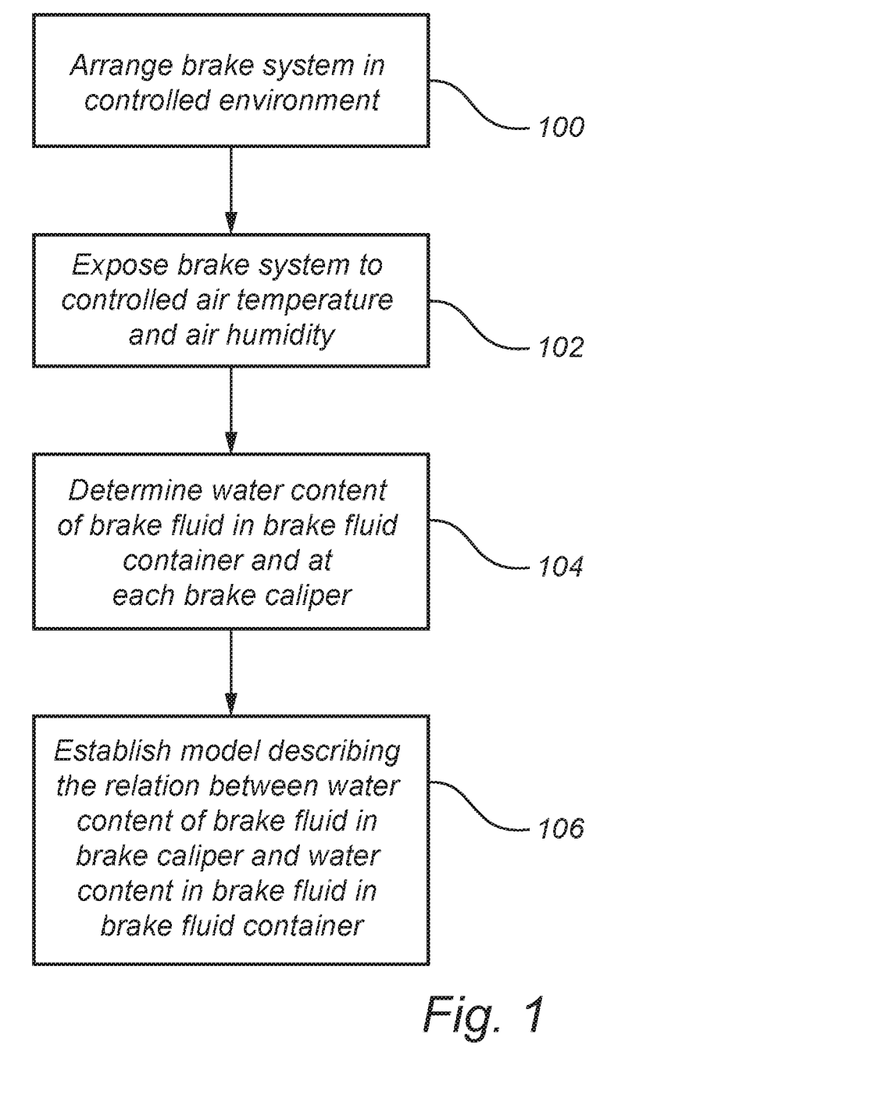
FIG. 1 is a flow chart outlining the general features of a method according to an invention.
Figure 2:
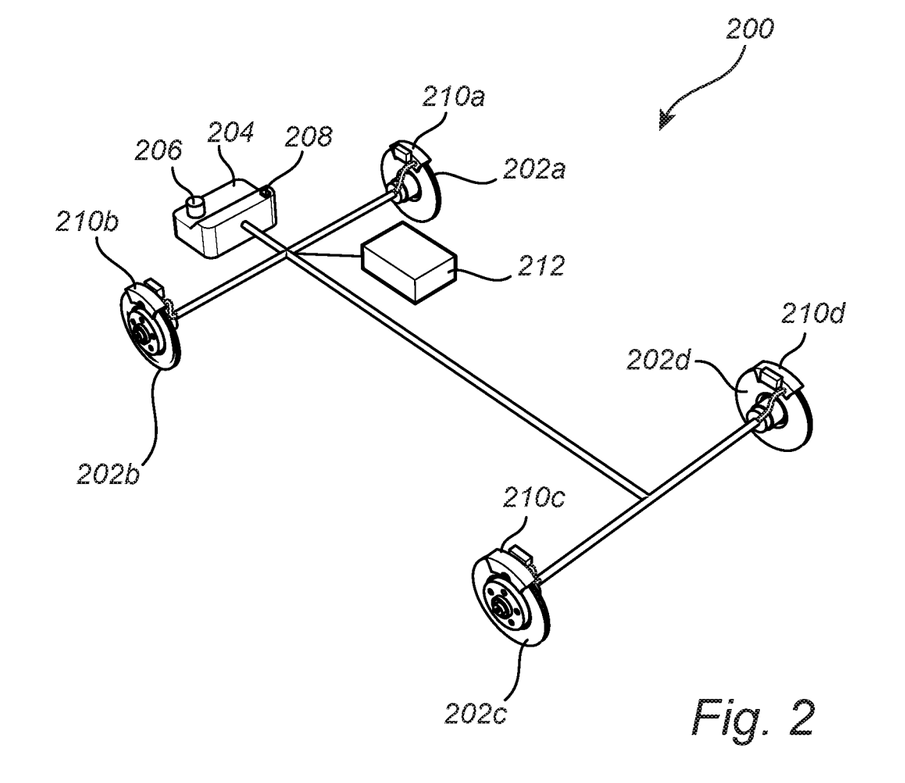
FIG. 2 schematically illustrates a brake system according to an embodiment of the invention.

FIG. 1 is a flow chart outlining the general features of a method according to an embodiment of the invention, and the method will be described with further reference to FIG. 2 schematically illustrating a brake system 200 according to an embodiment of the invention.

The simplified brake system 200 illustrated in FIG. 2 includes four brake calipers 202a-d, one for each wheel of a car, and a brake fluid container 204 which is typically arranged in the engine room of the car. The lid 206 of the brake fluid container includes a small opening or outlet (not shown) allowing the brake fluid of the brake system 100 to expand when heated without increasing the pressure of the brake system. This opening will also allow moist air to enter into the brake fluid container as the brake fluid cools down and contracts, thereby contributing to the increase in water content in the brake fluid.

In the described system 200, each of the plurality of brake calipers 202a-d includes a sensor 210a-d configured to detect a parameter indicative of a water content of the brake fluid. That parameter may for example be conductivity, since the relation between the conductivity and the water content in a known brake fluid can be considered to be known. The brake fluid container 204 also includes a sensor 208 for determining the water content of the brake fluid in the container 204. The sensor 208 in the container 204 may be of the same type as the sensors 210a-d in the brake calipers, but it is also possible to use a different type of sensor. In a test environment, it can for example be verified that the determined water content is accurate by using different types of sensors and comparing the results.

The method includes arranging 100 the brake system in a controlled environment. The controlled environment may also be referred to as an environment chamber or a climate chamber where the temperature and air humidity can be controlled with high accuracy.

Once the brake system 200 is placed in the controlled environment, it is exposed 102 to a controlled air temperature and air humidity for a predetermined period of time such that an increase in water content in the brake fluid is accelerated in comparison to an increase in water content during normal operating conditions of a vehicle.

During the time that the brake system 200 is located in the controlled environment, the water content of the brake fluid in the brake fluid container 204 and in each brake caliper 202a-d is repeatedly determined 104, using the described sensors, to describe the water content as a function of time.

Thereby, based on the determined water content as a function of time illustrating the water buildup in the brake fluid, a model is established 106 describing the relation between the water content of brake fluid in the brake caliper 202a-d and the water content of the brake fluid in the brake fluid container 204.

Figure 3:
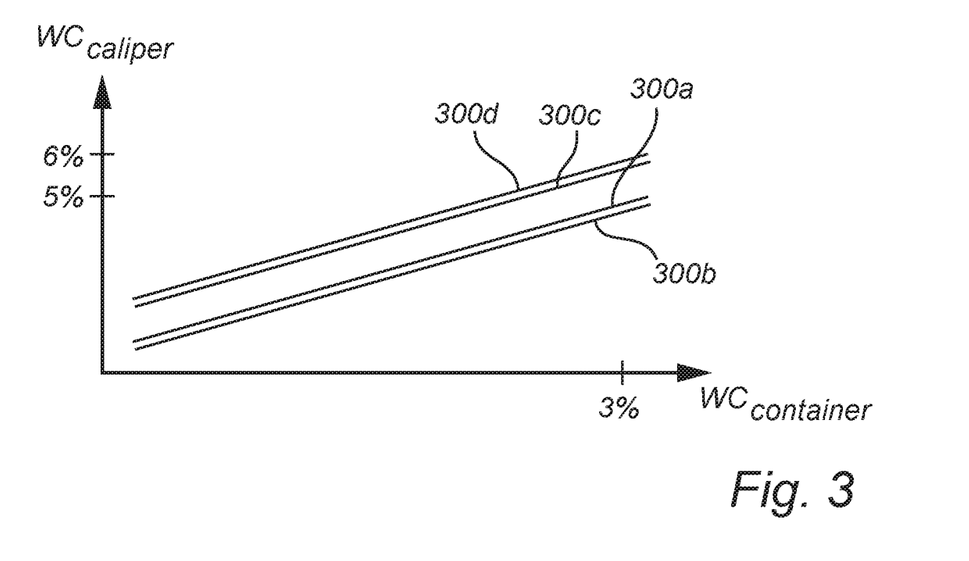
FIG. 3 schematically illustrates a model according to an embodiment of the invention.

FIG. 3 schematically illustrates example linear relations 300a-d between the water content of brake fluid in the brake calipers 202a-d and the water content in the brake fluid in the brake fluid container 204. In FIG. 3, lines 300a-b represent the front brake calipers 202a-b and lines 300c-d represent the rear brake calipers 202c-d. In the illustrated example, the water content is higher in the rear calipers 202c-d compared to in the front calipers 202a-b. Moreover, it can be seen that for a water content of approximately 3% in the brake fluid container 204, the water content is approximately 5% in the front calipers 202a-b and approximately 6% in the rear calipers 202c-d.

Once the described method has been performed, the relation between the water content of brake fluid in each brake caliper 202a-d and the water content of the brake fluid in the brake fluid container 204 is known for the specific brake system and brake fluid used in the test setup. Accordingly, the described method needs to be performed for each specific brake system used since variations in the length of brake hoses etc. may lead to different results.

Figure 4A:
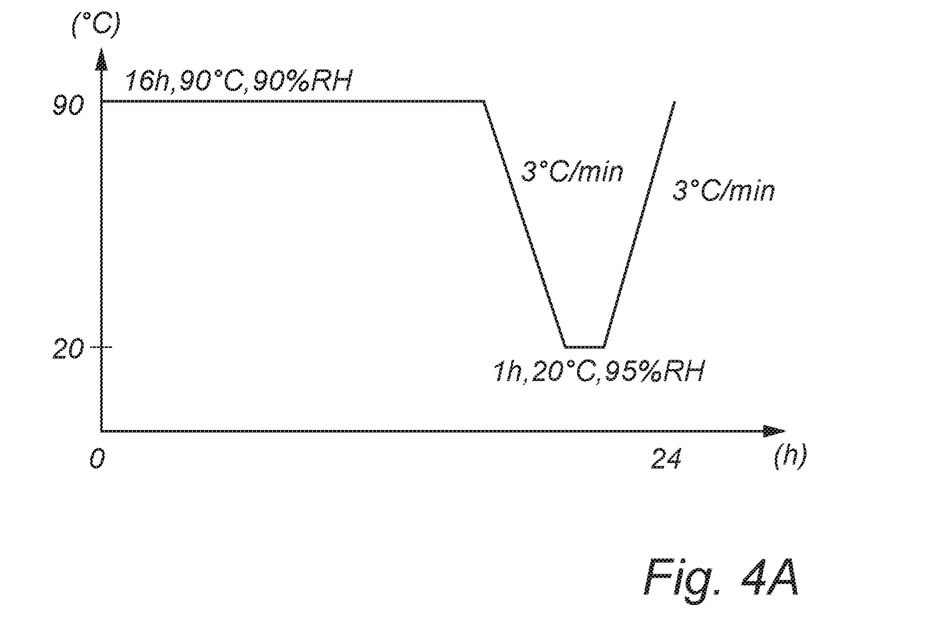
FIGS. 4A-B schematically illustrate example cycles according to embodiments of the invention.
Figure 4B:
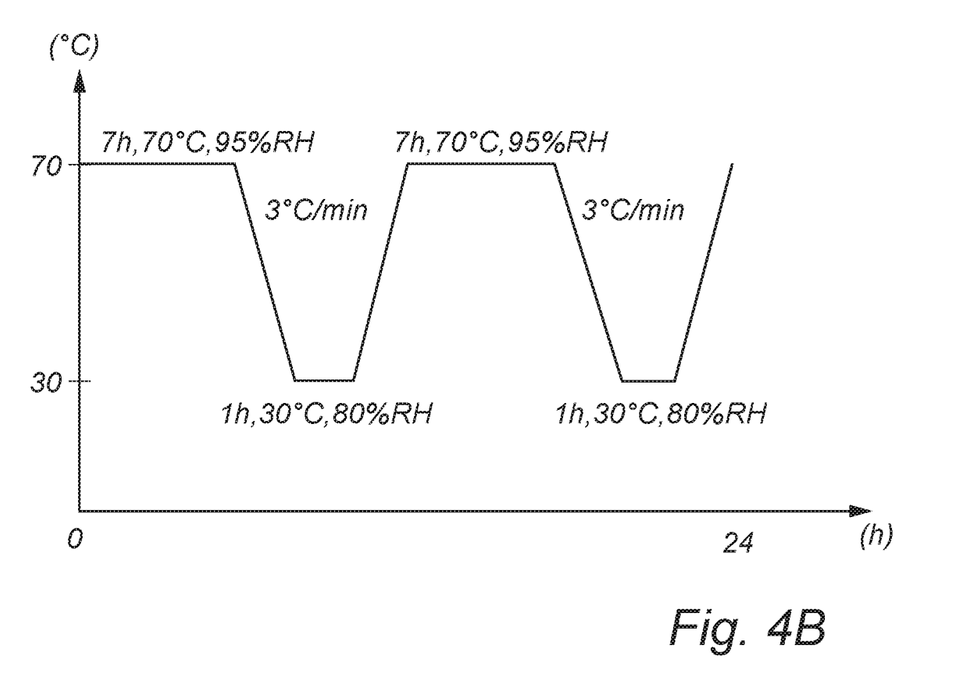

FIGS. 4A-B illustrate example cycles of controlling an increase and decrease in air temperature and humidity for forcing the brake system to breathe and for increasing the rate of water buildup in the brake system 200 compared to during normal operating conditions of a vehicle. In FIG. 4A, a temperature of 90° C. and a relative air humidity of 90% is maintained for 16 h, followed by a temperature ramp of 3° C./h down to 20° C. and 95% air humidity. The temperature is maintained at 20° C. for 1 h before ramping up the temperature to 90° C.

In FIG. 4B, a temperature of 70° C. and a relative air humidity of 95% is maintained for 7 h, followed by a temperature ramp of 3° C./h down to 30° C. and 80% air humidity. The temperature is maintained at 30° C. for 1 h before ramping up the temperature to 70° C. and repeating the cycle. The described cycles are repeated the number of times required for reaching a selected critical water content in the brake fluid. It should be noted that the described cycles merely represent illustrative examples, and that the cycles can be varied in almost endless ways while still adhering to the described method.

Figure 5:
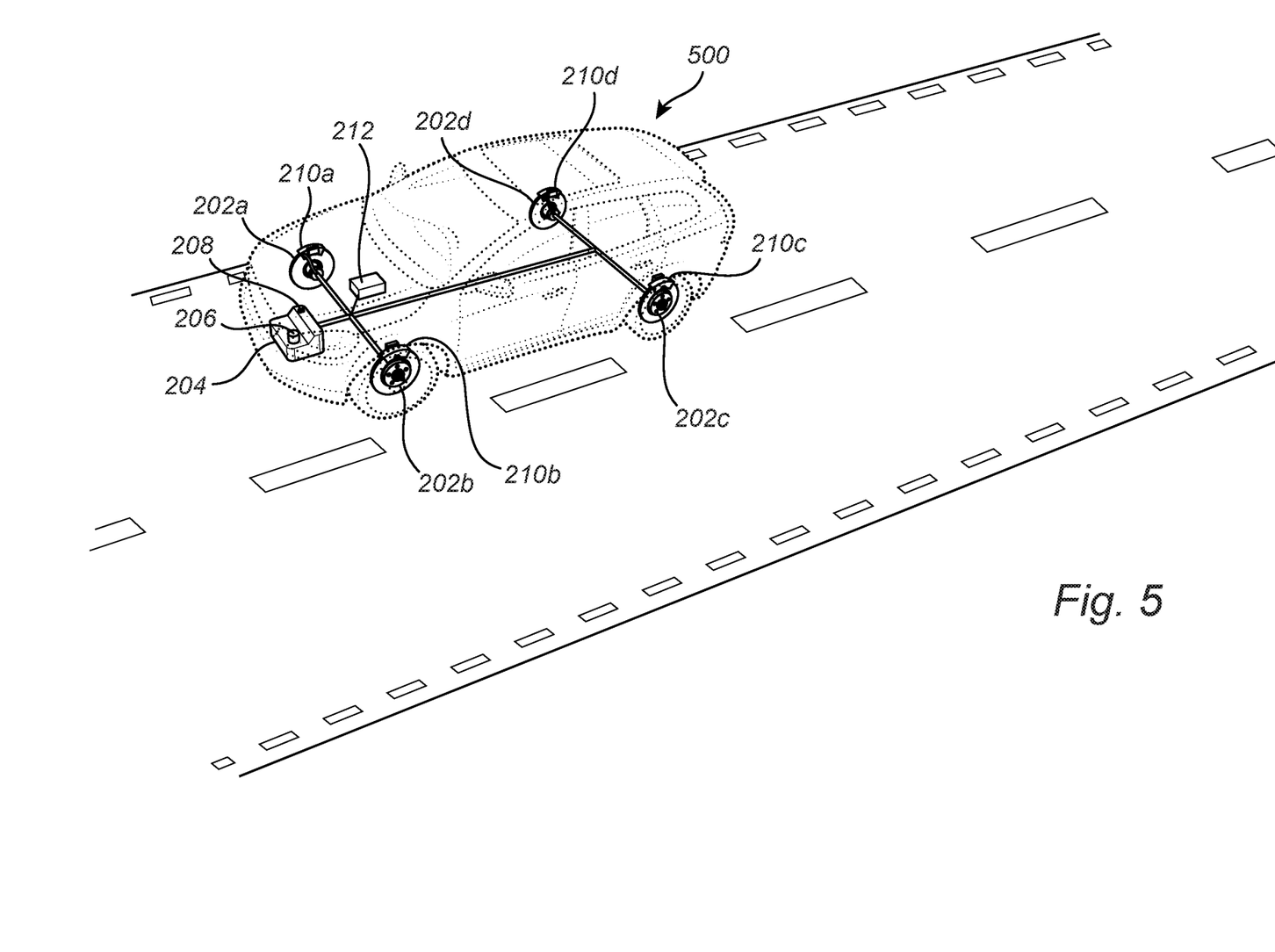
FIG. 5 schematically illustrates a vehicle including a brake system according to an embodiment of the invention.

FIG. 5 schematically illustrates a vehicle 500 including a brake system 200 according to an embodiment of the invention. The brake system 200 further includes a control unit 212 configured to determine a water content of the brake fluid in the brake fluid container 204 based on the detected parameter and to estimate a water content of the brake fluid in a brake caliper based on the determined water content of brake fluid in the brake fluid container 204 using the predetermined model describing the relation between the water content of brake fluid in a brake caliper and the water content in the brake fluid of the brake fluid container 204.

Accordingly, the derived model can be used in a vehicle 500 including only one sensor. The described brake system 200 in a vehicle is considered to include a conductivity sensor 208 in the brake fluid container 204, since changes in conductivity are relatively easy to detect using conventional conductivity sensors, and suitable sensors are readily available.

The control unit 212 may include a microprocessor, microcontroller, programmable digital signal processor or another programmable device. The control unit 212 may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. Moreover, the control unit 212 may be embodied in the form of a dedicated vehicle ECU (electronic control unit), or the functionality of the control unit may be implemented in a general purpose ECU.

In a vehicle, it may be required that the type of brake fluid being used in the brake system is specified. Preferably, the type of brake fluid to use is defined by the manufacturer and not changed during the vehicle life, thereby ensuring that the model is reliable. However, it is also possible that a vehicle is provided with models for different brake fluids so that a change in the type of brake fluid can be defined in control settings of the vehicle.

With further reference to FIG. 5, the control unit 212 may be configured to estimate a water content of the brake caliper having highest water content for a given water content of the brake fluid in the brake fluid container according to the predetermined model as illustrated in FIG. 3.

The control unit 212 may also be configured to estimate a water content of the brake caliper having the longest fluid connection between the brake caliper and the brake fluid container 204, which depends both on the placement of the brake fluid container and on the routing of the brake fluid tube and hose.

It is also possible that the control unit is configured to estimate a water content of the brake caliper 202d at the rear wheel on a side opposite of the driver side of the vehicle 500, i.e. the rear right wheel for a right-hand traffic vehicle.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for estimating a water content of brake fluid in a brake system comprising a plurality of brake calipers and a brake fluid container, each of the plurality of brake calipers and the brake fluid container comprising a sensor configured to detect a parameter indicative of the water content of the brake fluid, the method comprising:

arranging the brake system in a controlled environment;
for a predetermined time period, exposing the brake system to a controlled air temperature and air humidity for a predetermined period of time such that an increase in water content in the brake fluid is accelerated in comparison to an increase in water content during normal operating conditions of a vehicle;

determining the water content of the brake fluid in the brake fluid container and in each brake caliper as a function of time during the predetermined time period; and based on the determined water content as a function of time, establishing a model describing the relation between the water content of brake fluid in a brake caliper and the water content in the brake fluid in the brake fluid container.

2. The method according to claim 1, further comprising repeatedly increasing and decreasing the air temperature and the air humidity according to a predetermined cycle during the predetermined time period.

3. The method according to claim 1, wherein a maximum air temperature is in the range of 60 to 100° C.

4. The method according to claim 1, wherein a maximum air humidity is in the range of 80 to 100%.

5. The method according to claim 1, wherein the predetermined time period is in the range of 50 to 100 days.

6. The method according to claim 1, wherein establishing a model comprises establishing a model describing the water content of brake fluid in each of the plurality of brake calipers as a function of the water content of the brake fluid in the brake fluid container.

7. The method according to claim 1, wherein determining the water content of the brake fluid comprises measuring a conductivity, a density, a viscosity and/or a refraction of the brake fluid.

8. The method according to claim 1, further comprising, in a brake system in a vehicle comprising a plurality of brake calipers and a brake fluid container, the brake fluid container comprising a sensor configured to detect a parameter indicative of a water content of the brake fluid, determining a water content in the brake fluid container and estimating a water content in a brake caliper based on the established model.

9. The method according to claim 8, further comprising estimating a water content of the brake caliper assumed to have a highest water content for a given water content of the brake fluid in the brake fluid container according to the predetermined model.

10. The method according to claim 8, further comprising estimating a water content of the brake caliper having a longest fluid connection between the brake caliper and the brake fluid container.

11. The method according to claim 8, further comprising estimating a water content of the brake caliper at the rear wheel on a side opposite of a driver side of the vehicle.

12. A brake system for a vehicle, the brake system comprising:

a plurality of brake calipers;

a brake fluid container comprising a sensor configured to detect a parameter indicative of a water content of the brake fluid in the brake fluid container; and a control unit configured to determine a water content of brake fluid in the brake fluid container based on the detected parameter and to estimate a water content of the brake fluid in a brake caliper based on the determined water content of brake fluid in the brake fluid container using a predetermined model describing the relation between the water content of brake fluid in a brake caliper and the water content in the brake fluid of the brake fluid container;

wherein the predetermined model is established based on a determined water content as a function of time by:

arranging the brake system in a controlled environment;

for a predetermined time period, exposing the brake system to a controlled air temperature and air humidity for a predetermined period of time such that an increase in water content in the brake fluid is accelerated in comparison to an increase in water content during normal operating conditions of the vehicle; and determining the water content of the brake fluid in the brake fluid container and in each brake caliper as a function of time during the predetermined time period.

13. The brake system according to claim 12, wherein the control unit is further configured to determine a water content of the brake caliper having a highest water content for a given water content of the brake fluid in the brake fluid container according to the predetermined model.

14. The brake system according to claim 12, wherein the control unit is further configured to estimate a water content of the brake caliper having a longest fluid connection between the brake caliper and the brake fluid container.

15. The brake system according to claim 12, wherein the control unit is further configured to estimate a water content of the brake caliper at the rear wheel on a side opposite of the driver side of the vehicle.

* * * * *